United States Patent Office
3,085,934
Patented Apr. 16, 1963

3,085,934
IMPROVED PHENOTHIAZINE COMPOSITION AND METHOD OF EMPLOYING SAME
Donald E. Vierling, 4594 Doverdell Drive, Pittsburgh, Pa.
No Drawing. Filed Dec. 20, 1960, Ser. No. 77,025
5 Claims. (Cl. 167—53)

This invention relates to a new composition of matter containing phenothiazine, and to a process for administering the same to animals to inhibit photosensitized keratitis thereof.

Phenothiazine is an excellent anthelmintic for livestock and poultry. Unfortunately, when phenothiazine has been administered to livestock, particularly cattle, sheep and goats, it has been found, in many instances, that photosensitized keratitis soon follows. Photosensitized keratitis is often characterized by bilateral conjunctivitis, lacrimation, photophobia, edema of the eyelids and periorbital skin and opalescence or opacity of the cornea. Symptoms and lesions appear to develop only when the treated animal is exposed to bright sunshine within a critical period of exposure, which is generally within a period between about twelve (12) to thirty-six (36) hours after treatment with phenothiazine. It has been found that as little as one (1) hour of exposure to bright sunlight can induce symptoms and lesions to the animal.

Photosensitized keratitis can, therefore, be extremely serious. In some instances, temporary blindness results, while in more serious cases, permanent blindness may occur. This condition has a tendency to throw the animals off feed, with resultant loss in weight and susceptibility to disease. In extreme cases wherein the condition does not alleviate itself, the animal may have to be destroyed.

I have discovered that photosensitized keratitis can be inhibited in animals following treatment with phenothiazine if the phenothiazine which is administered to the animals has admixed therewith a small or controlled amount of a silicone. The composition comprising phenothiazine and a silicone is also a new composition of matter.

By "silicone," I mean to include compounds containing the elements silicon, oxygen and organic groups, with the silicon being present in sufficient amounts to affect the properties thereof measurably. In general, the silicon is bonded to an adjacent silicon through the medium of an oxygen atom, with at least one of the remaining substituents on the silicon bond being satisfied with an organic radical. The remaining substituent on the silicon bond is preferably an organic radical, but can be hydrogen. Preferably, the organic radical can be an alkyl group, such as methyl, ethyl, propyl, butyl, amyl, hexyl, heptyl, octyl, etc.; or an aryl group, such as phenyl, tolyl, xylyl naphthyl, etc. Additionally, the organic radical can be an ester radical, an ether radical, an alcohol radical, a carboxyl radical, etc. Examples of silicones which can be employed are:

$[CH_3HSiO]_3$,
$[CH_3HSiO]_6$,
$(CH_3)_3SiOSiH(CH_3)OSi(CH_3)_3$,
$(CH_3)_3Si[OSiH(CH_3)]_4OSi(CH_3)_3$,
$(CH_3)_3SiOSi(CH_3)_3$,
$(CH_3)_3SiOSi(CH_3)_2CH_2COOH$,
$CH_3[(CH_3)_2SiO]_2Si(CH_3)_3$,
$CH_3[(CH_3)_2SiO]_{10}Si(CH_3)_3$,
$[(ClCH_2)(CH_3)_2Si]_2O$,
$CH_2OH(CH_3)_2SiOSi(CH_3)_2CH_2OH$,
$(CH_3)_3SiOSi(CH_3)_2CH_2OCOCH_3$,
$(CH_3)_3SiO[(CH_3)(CH_2Cl)SiO]_1Si(CH_3)_3$,
$(CH_3)_3SiO[(CH_3)(CH_2Cl)SiO]_4Si(CH_3)_3$,
$[(CH_3)(C_6H_5)_2Si]_2O$,
$[(CH_3)(C_6H_5CH_2)_2Si]_2O$,
$[(CH_3)_3SiO]_3SiCH_3$,
$[(CH_3)_2SiO]_3$,
$[(CH_3)_2SiO]_9$,
$[(CH_3)_2SiO]_3[(ClCH_2)(CH_3)SiO]$,
$(CH_3)_8Si_5O_6$,
$(CH_3)_{10}Si_8O_{11}$,
$(CH_3)_{14}Si_8O_9$,
$[(CH_3)_3SiO]_2Si(C_2H_5)_2$,
$C_2H_5O[(CH_3)_2SiO]C_2H_5$,
$C_2H_5O[(CH_3)_2SiO]_{11}C_2H_5$,
$C_2H_5O[Si(CH_3)(OC_2H_5)O]_2C_2H_5$,
$C_2H_5O[Si(CH_3)(OC_2H_5)O]_5C_2H_5$,
$[(C_2H_5)_2SiO]_3$,
$[(C_2H_5)(n-C_3H_7)(C_6H_5CH_2)Si]_2O$,
$[(C_2H_5)(i-C_4H_9)(C_6H_5CH_2)Si]_2O$,
$[(C_2H_5)(C_6H_5)_2Si]_2O$,
$[(C_2H_5)(C_6H_5CH_2)_2Si]_2O$,
$[(C_2H_5)(C_6H_5)SiO]_3$,
$[(n-C_3H_7)_3Si]_2O$,
$[(i-C_5H_{11})_3Si]_2O$,
$[(C_6H_{11})_2SiO]_3$,
$[(C_6H_{11})(C_6H_5)SiO]_3$,
$[(C_6H_5)_3Si]_2O$,
$[(C_6H_5CH_2)_3Si]_2O$,
$[(p-CH_3C_6H_4)_3Si]_2O$,
$[(C_6H_5)_2SiO]_4$,
$[(C_6H_5CH_2)_2SiO]_3$,
$[(p-CH_3C_6H_4)_2SiO]_3$, etc.

The amount of silicone which is admixed with the phenothiazine to form the new composition of matter, and which is sufficient to inhibit photosensitized keratitis in animals to which the same is administered, is extremely small. Thus, amounts of silicone, relative to the phenothiazine, as low as about 0.0005 percent by weight is sufficient and improved results will be obtained. In general, at least about 0.003 percent by weight of silicone relative to the phenothiazine is preferred. Large amounts of silicone can be admixed with the phenothiazine; and improved results in this respect will still be obtained, but for economical reasons and because such large amounts will produce results consistent with the beneficial results obtained with lesser amounts of silicone, I prefer to employ no more than about one percent by weight of silicone relative to the phenothiazine.

The new composition of matter can be prepared in any suitable manner which will assure proper admixture of the individual components thereof. Thus, the silicone in selected amounts can be added directly to the phenothiazine; and the two components can be mechanically mixed. The silicone can be admixed as such with the phenothiazine; or it can be employed in the form of an aqueous emulsion, for example, in the form of a thirty (30) percent aqueous emulsion.

The new composition of this invention can be administered to the host animal in any suitable manner. Thus, the new composition can be employed as a drench slurry in the form of an aqueous suspension comprising about 37½ percent by weight of phenothiazine, three (3) percent by weight of bentonite and the remainder water. In preparing such suspensions, I do not wish to be so limited, however, for the amount of phenothiazine present can be as low as about ten (10) percent by weight or as high as about 80 percent by weight, and the bentonite as high as about 20 percent by weight or as low as about one percent by weight. The amount of silicone present is then determined, as noted hereinabove, on the basis of the amount of phenothiazine present.

While the new composition of this invention includes as its necessary ingredients phenothiazine and a silicone in an amount sufficient to inhibit photosensitized keratitis in animals consuming the same, it is understood that other ingredients which do not materially affect the desired characteristics of the composition, as enumerated hereinabove, can also be present. Thus wetting agents, flavoring agents, trace chemicals, etc., can be present in desired and characteristic amounts; and the beneficial advantages hereinabove attributed to the new composition of matter will still be present.

Without attempting to be limited thereby, and solely in order to further illustrate the present invention, attention is invited to the following:

EXAMPLE I

In preparing the new composition of matter employed in the present example, methylpolysiloxane (F–1, obtained from Hadag Chemical Corporation, 7247 North Central Park, Chicago 45, Illinois) having the following physical properties was used: weight per gallon 8.3–8.4 pounds; specific gravity at 25° C. 0.99–1.0; viscosity at 25° C. 325 centistokes; pour point —30° F.; flash point above 600° F.; soluble in amyl acetate, aromatic solvents, 2-ethylhexanol and kerosene; and insoluble in water, paraffin oil, glycols, ethanol, methanol and glycerine. The composition was prepared by placing phenothiazine having an average size of about 6 microns in a conical blender. While the conical blender was rotated at the rate of ten revolutions per minute, the methylpolysiloxane defined above was sprayed over the phenothiazine therein. This was continued for twenty minutes to obtain a uniform mixture of phenothiazine and silicone. At the end of this period the mixture was analyzed and found to contain phenothiazine and 0.004 percent by weight thereof of methylpolysiloxane.

In order to prepare the drench slurries used in the present example, as well as the examples following herein, water was placed in a high speed blender, and while the same was rotated at a rate of 1760 revolutions per minute, bentonite clay was added thereto over a period of 15 minutes. This was continued for an additional 30 minutes, while the phenothiazine composition prepared above was also added thereto. A slurry was obtained containing 37½ percent by weight of phenothiazine, 2½ percent by weight of bentonite clay, and the remainder water. As noted, the silicone was present in an amount of 0.004 percent by weight based on the phenothiazine.

Two similar herds of beef cattle were selected according to weight and other similar characteristics. Group "A" consisted of six animals having an average weight of 314 pounds; and group "B" consisted of six animals having an average weight of 309 pounds. Group "A" was given a drench slurry identical to the one defined above, but with the exception that no silicone was employed in admixture with phenothiazine. Each of the beef cattle in group "A" was thus given 60 grams of phenothiazine. The cattle in group "B" was similarly treated, except that the drench slurry was the one prepared above containing the defined amount of silicone in admixture with the phenothiazine. Again 60 grams of phenothiazine was administered to each animal.

Each of these groups was left in bright sunlight. At sunset and until the following day when they were again subjected to bright sunlight, the cattle were subjected to a battery of ten 150-watt floodlights per animal. The reading under these conditions at the animals' eyes, as measured by a General Electric Exposure Meter, Type DW–68, came to a value between 100 and 200 foot candles. This procedure of subjecting the cattle's eyes continuously to alternating periods of strong natural light and artificial light was continued for 96 hours. At the end of this period, each of the animals in group "A" had a severe or acute case of keratitis. By "acute," I mean that the animals were suffering from severe conjunctivitis and temporary blindness, so that animals were not aware of a hand waved in front of their eyes. Group "B" showed no symptoms of keratitis.

In addition, further tests were made using the same compositions and procedures employed in Example I. The data obtained are summarized below in Table I.

Table 1

| Example | Type of Animal | Group | Number of Animals | Average Weight, Lbs. | Treatment | | Keartitis Symptoms |
|---|---|---|---|---|---|---|---|
| | | | | | Phenothiazine, Grams/Animal | Methyl polysiloxane, percent by wt., Based on Phenothiazine | |
| I | Goats | "A" | 4 | 68 | 25 | | Acute. |
| | | "B" | 4 | 65 | 25 | 0.250 | Nohe. |
| II | Sheep | "A" | 5 | 72 | 25 | | Acute. |
| | | "B" | 5 | 69 | 25 | 0.005 | None. |
| III | Pigs | "A" | 4 | 105 | 10 | | Acute |
| | | "B" | 4 | 98 | 10 | 0.005 | None. |
| IV | Beef cattle | "A" | 4 | 460 | 60 | | Acute. |
| | | "B" | 4 | 448 | 60 | 0.001 | None. |
| V | Beef cattle | "A" | 4 | 428 | 60 | | Acute. |
| | | "B" | 4 | 422 | 60 | 0.001 | None. |

The above examples clearly show that the new composition of this invention, namely, phenothiazine admixed with a silicone, is completely effective in inhibiting photosensitized keratitis in animals to which the same has been administered.

Obviously, many modifications and variations of the invention, as hereinabove set forth, can be made without departing from the spirit and scope thereof, and therefore only such limitations should be imposed as are indicated in the appended claims.

I claim:

1. A process for inhibiting photosensitized keratitis in animals which comprises administering thereto a composition comprising phenothiazine and a silicone.

2. A process for inhibiting photosensitized keratitis in animals which comprises administering thereto a composition comprising phenothiazine and methylpolysiloxane.

3. A process for inhibiting photosensitized keratitis in animals which comprises administering thereto a composition comprising phenothiazine and at least about 0.0005 percent by weight thereof of methylpolysiloxane.

4. As a new composition of matter, phenothiazine having associated therewith about 0.0005 to about one percent by weight thereof of a silicone.

5. As a new composition of matter, phenothiazine having associated therewith about 0.0005 to about one percent by weight of methylpolysiloxane.

References Cited in the file of this patent

Hain: Chem. Abst., vol. 49, 1955, page 1320h.
Oparina: Chem. Abst., vol. 53, 1959, page 11281.